United States Patent
Kuchi et al.

(10) Patent No.: US 6,816,557 B2
(45) Date of Patent: *Nov. 9, 2004

(54) NON-ZERO COMPLEX WEIGHTED SPACE-TIME CODE FOR MULTIPLE ANTENNA TRANSMISSION

(75) Inventors: Kiran Kuchi, Irving, TX (US); Ari Hottinen, Espoo (FI); Olav Tirkkonen, Helsinki (FI); Markku Kuusela, Helsinki (FI); Yrjo Kaipainen, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 31 days.

This patent is subject to a terminal disclaimer.

(21) Appl. No.: 10/078,840

(22) Filed: Feb. 20, 2002

(65) Prior Publication Data

US 2003/0012299 A1 Jan. 16, 2003

Related U.S. Application Data

(63) Continuation-in-part of application No. 09/819,573, filed on Mar. 28, 2001.

(51) Int. Cl.$^7$ ............................................. H04L 27/04
(52) U.S. Cl. ...................... 375/299; 375/267; 455/101
(58) Field of Search ................................ 375/299, 267, 375/146, 260; 370/204, 209; 455/101, 103

(56) References Cited

U.S. PATENT DOCUMENTS

| | | | |
|---|---|---|---|
| 6,097,771 A | 8/2000 | Lucent Technologies Inc. | |
| 6,178,196 B1 | 1/2001 | Naguib et al. | |
| 6,317,411 B1 * | 11/2001 | Whinnett et al. | 375/267 |
| 6,317,468 B1 | 11/2001 | Lucent Technologies Inc. | |
| 6,542,556 B1 * | 4/2003 | Kuchi et al. | 375/299 |

FOREIGN PATENT DOCUMENTS

| | | |
|---|---|---|
| GB | 2237706 | 5/1991 |
| WO | WO 99/14871 | 3/1999 |
| WO | WO 97/41670 | 11/1999 |
| WO | WO 00/11806 | 3/2000 |
| WO | WO 00/18056 | 3/2000 |
| WO | WO 00/49780 | 8/2000 |
| WO | WO 00/51265 | 8/2000 |
| WO | WO 01/19013 A1 | 3/2001 |
| WO | WO 01/54305 A1 | 7/2001 |
| WO | WO 01/56218 A1 | 8/2001 |
| WO | WO 01/63826 A1 | 8/2001 |
| WO | WO 01/69814 A1 | 9/2001 |

OTHER PUBLICATIONS

D. Mihai Ionescu; New Results on Space–Time Code Design Criteria; 1999 IEEE; pp. 684–687; 0–7803–5668–3/99;.

Tarokh, V., et al., Space–Time Codes for High Data Rate Wireless Communication: Performance Criterion and Code Construction; 1998 IEEE; IEEE Transactions on Information Theory, vol. 44, No. 2, Mar. 1998.

Edited by Holma H. et al.; WCDMA for UMTS Radio Access for Third Generation Mobile Communications; Reprinted Jun. 2000; p. 97; John Wiley & Sons, Ltd., Baffins Lane, Chichester, West Sussex, PO19 1UD, England.

(List continued on next page.)

*Primary Examiner*—Temesghen Ghebretinsae
(74) *Attorney, Agent, or Firm*—Brian T. Rivers; Federico Fraccaroli

(57) ABSTRACT

The present invention presents a method and apparatus for phase hopping and space-time coding signals for transmission on multiple antennas. The method and apparatus provides expansion of a N×N' space time block code to a M×M' space time block code, where M>N, by using phase hopping on the symbols within the N×N' space time block code to allow transmission of the space time block code on a number of diversity antennas greater than N'. A result of M antenna diversity may be achieved for M transmit antennas.

3 Claims, 11 Drawing Sheets

OTHER PUBLICATIONS

Tarokh, V., et al.; Space–Time Block Coding for Wireless Communications; Performance Results; 1999 IEEE; IEEE Journal on Selected Areas in Communications, vol. 17, No. 3, Mar. 1999.

Tarokh, V. et al; New Detection Schemes for Transmit Diversity with No Channel Estimation; 1998 IEEE; pp. 917–920 0–7803–5106–1/98.

Naguib, A.F. et al; Space–Time Coded Modulation for High Data Rate Wireless Communications; 1997 IEEE; pp. 102–109; 0–7803–4198–8/97.

Shiu D. et al.; "Scalable Layered Space–Time Codes for Wireless Communications: Performance Analysis and Design Criteria"; 0–7803–5668–Mar. 1999; 159–163 pp.; 1999 IEEE; University of California at Berkeley USA.

Alamouti, S.M. et al; Trellis–Coded Modulation and Transmit Diversity; Design Criteria and Performance Evaluation; 1998 IEEE; pp. 703–707; 0–7803–5106–1/98.

Shiu, D. et al,; "Layered Space–Time Codes for Wireless Communications Using Multiple Transmit Antennas"; 0–7803–5284–X99; 436–440 pp.; 1999 IEEE; University of California at Berkeley USA.

Hassibi, B. et al; "High–Rate Linear Space–Time Codes"; IEEE Apr. 2001; pp. 2461–2464, 0–7803–7041–04/01.

Lo, T. et al; Space–Time Block Coding–From a Physical Perspective; 1999 IEEE; pp. 150 –153; 0–7803–5668–3/99.

Seshadri, N. et al; Space–Time Codes for Wireless Communication; Code Construction; 1994 IEEE; pp. 637–641; 0–7803–3659–3/97.

Tarokh, V., et al.; The Application of Orthogonal Designs to Wireless Communication; 1998 IEEE; pp. 46–47; 0–7803–4408–1/98.

Tarokh, V. et al; Space–Time Codes for High Data Rate Wireless Communication; Performance Criteria in the Presence of Channel Estimation Errors, Mobility, and Multiple Paths; 1999 IEEE; IEEE Transactions on Communications; vol. 47, No. 2; Feb. 1999.

Tarokh, V. et al; A Differential Detection Scheme for Transmit Diversity; 1999 IEEE; pp. 1043–1047; 0–7803–5668–3/99.

Foschini, G.; Layered Space–Time Architecture for Wireless Communication in a Fading Enviroment When Using Multi–Element Antennas; Bell Labs Technical Journal, 1996; pp. 41–59.

Tirkkonen, O. et al.; Complex Space–Time Block Codes for Four Tx Antennas; IEEE; 2000; pp. 1005–1009; 0–7803–6451–01/10.

Hottinen, A. et al.; Closed–loop transmit diversity techniques for multi–element transceivers; IEEE 2000; pp.70–73; 0–7803–6507–0/00.

Tirkkonen, O. et al.; Minimal Non–Orthogonality Rate 1 Space–Time Block Code for 3# Tx Antennas; IEEE Sep. 6–8, 2000; 6th Int. Symp. on Spread–Spectrum Tech. & Appli., NJIT. New Jersey. USA; pp. 429–432.

Sweatman, C. et al.; A Comparison of Detection Algorithms including BLAST for Wireless Communication using Multiple Antennas; IEEE 2000; pp. 698–703; 0–7803–6465–5/ 00.

DAmen, O. et al.; Lattice Code Decoder for Space–Time Codes; IEEE 2000; pp. 161–163; 1089–7798/00; IEEE Communications Letters. vol. 4, No. 5, May 2000.

Calderbank, A. et al.; Space–Time Codes for Wireless Communication; 19997 IEEE; ISIT 1997, Ulm, Germany, Jun. 29–Jul. 4; pp. 146.

Tarokh, V. et al.; Recent Progress in Space–Time Block and Trellis Coding; 1998 IEEE; ISIT 1998, Cambridge, MA. USA; Aug. 16–21; p. 314.

Rohani, K. et al.; A Comparison of Base Station Transmit Diversity Methods for Methods for Third Generation Cellular Standards; 1999 IEEE; 0–7803–5565–2/99; pp. 351–355.

Jalloul. L. et al.; Performance Analysis of CDMA Transmit Diversity Methods; 1999 IEEE; 0–7803–5435–4/99; pp. 1326–1330.

Raitola. M. et al.; Transmission Diversity in Wideband CDMA; 1999 IEEE;0–7803–5565–2/99; pp. 1545–1549.

Correia, A. et al.; Optimised Constellations for Transmitter Diversity; 1999 IEEE; 0/7803–5435–4/99; pp. 1785–1789.

Tarokh, V. et al.; A Differential Detection Scheme for Transmit Diversity; 1999 IEEE; 0–7803–5668–3/99; pp. 1043–1047.

Buey, Jiann Chang; Concatenceted Coding for transmit Diversity Systems Proceedings of the 1999 VTC–Fall IEEE VTS 50th Vehicular Technology Conference Gateway to 21st Centery Communications Village; Neth, Sep. 19–22, 1999, vol. 5 1999.

A. Hiroike, F. Adachi, N. Nakajima "Combined Effects of Phase Sweeping Transmitter Diversity and Channel Coding", IEEE Transactions on Vehicular Technology, vol. 41, No. 2. May 1992.

* cited by examiner

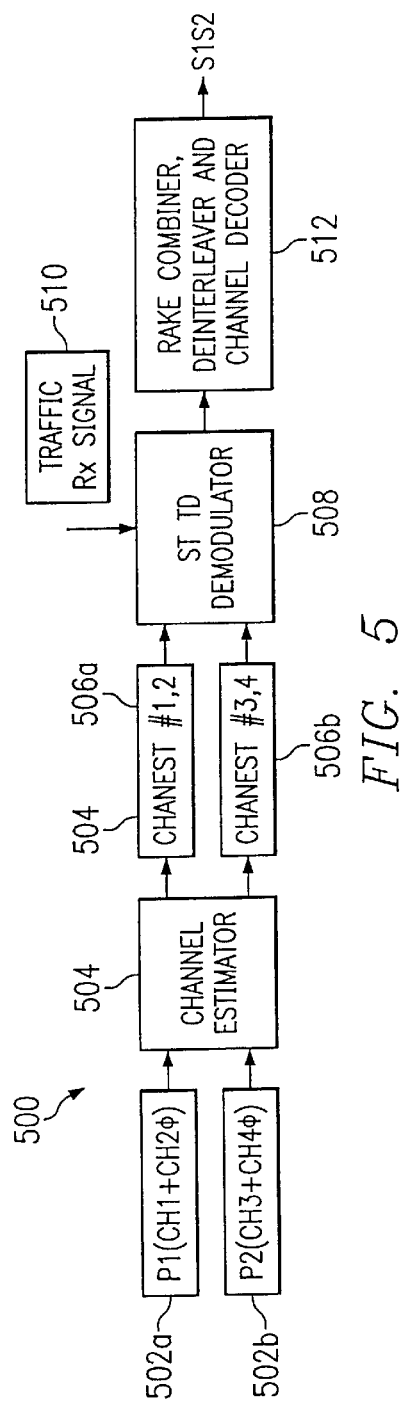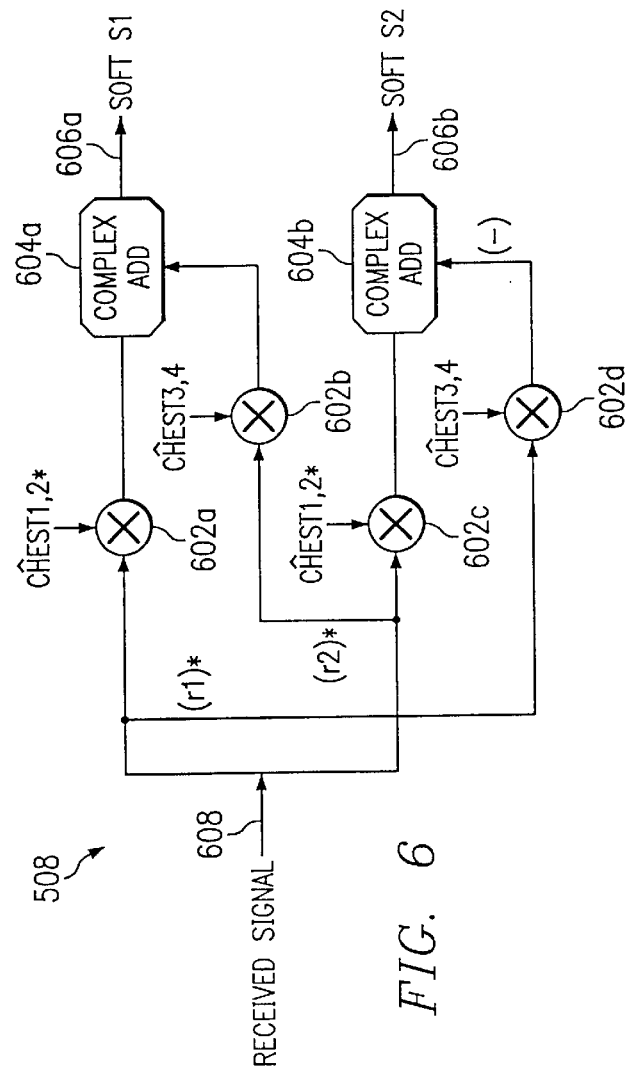
FIG. 5
FIG. 6

NON-ZERO COMPLEX WEIGHTED SPACE-TIME CODE FOR MULTIPLE ANTENNA TRANSMISSION

This is a continuation-in-part of application Ser. No. 09/819,573, filed Mar. 28, 2001.

FIELD OF THE INVENTION

This invention relates to a method and apparatus for achieving transmit diversity in telecommunication systems and, more particularly, to a method and apparatus for non-zero complex weighting and space-time coding signals for transmission on multiple antennas.

BACKGROUND OF THE INVENTION

As wireless communication systems evolve, wireless system design has become increasingly demanding in relation to equipment and performance requirements. Future wireless systems, which will be third and fourth generation systems compared to the first generation analog and second generation digital systems currently in use, will be required to provide high quality high transmission rate data services in addition to high quality voice services. Concurrent with the system service performance requirements there will be equipment design constraints, which will strongly impact the design of mobile terminals. The third and fourth generation wireless mobile terminals will be required to be smaller, lighter, more power-efficient units that are also capable of providing the sophisticated voice and data services required of these future wireless systems.

Time-varying multi-path fading is an effect in wireless systems whereby a transmitted signal propagates along multiple paths to a receiver causing fading of the received signal due to the constructive and destructive summing of the signals at the receiver. Several methods are known for overcoming the effects of multi-path fading, such as time interleaving with error correction coding, implementing frequency diversity by utilizing spread spectrum techniques, or transmitter power control techniques. Each of these techniques, however, has drawbacks in regard to use for third and fourth generation wireless systems. Time interleaving may introduce unnecessary delay, spread spectrum techniques may require large bandwidth allocation to overcome a large coherence bandwidth, and power control techniques may require higher transmitter power than is desirable for sophisticated receiver-to-transmitter feedback techniques that increase mobile terminal complexity. All of these drawbacks have negative impact on achieving the desired characteristics for third and fourth generation mobile terminals.

Antenna diversity is another technique for overcoming the effects of multi-path fading in wireless systems. In diversity reception, two or more physically separated antennas are used to receive a transmitted signal, which is then processed by combining and switching to generate a received signal. A drawback of diversity reception is that the physical separation required between antennas may make diversity reception impractical for use on the forward link in the new wireless systems where small mobile terminal size is desired. A second technique for implementing antenna diversity is transmit diversity. In transmit diversity a signal is transmitted from two or more antennas and then processed at the receiver by using e.g. maximum likelihood sequence estimator (MLSE), minimum mean square error (MMSE) receivers, Maximum-a Posteriori receivers, or their approximations. Transmit diversity has more practical application to the forward link in wireless systems in that it is easier to implement multiple antennas in the base station than in the mobile terminal.

Transmit diversity for the case of two antennas is well studied. Alamouti has proposed a method of transmit diversity for two antennas that offers second order diversity for complex valued signals. S. Alamouti, "A Simple Transmit Diversity Technique for Wireless Communications," *IEEE Journal on Selected Areas of Communications*, pp. 1451–1458, October 1998. The Alamouti method involves simultaneously transmitting two signals from two antennas during a symbol period. During one symbol period, the signal transmitted from a first antenna is denoted by S0 and the signal transmitted from the second antenna is denoted by S1. During the next symbol period, the signal −S1* is transmitted from the first antenna and the signal S0* is transmitted from the second antenna, where * is the complex conjugate operator. A similar diversity transmission system may also be realized in code domain. As an example, two copies of the same symbol can be transmitted in parallel using two orthogonal Walsh codes. Similar techniques can be also used to construct a space-frequency coding method.

Extension of the Alamouti method to more than two antennas is not straightforward. Tarokh et al. have proposed a method using rate=½, and ¾ SpaceTime Block codes for transmitting on three and four antennas using complex signal constellations. V. Tarokh, H. Jafarkhani, and A. Calderbank, "Space-Time Block Codes from Orthogonal Designs," *IEEE Transactions on Information Theory*, pp. 1456–1467, July 1999. This method has a disadvantage in a loss in transmission rate and the fact that the multi-level nature of the ST coded symbols increases the peak-to-average ratio requirement of the transmitted signal and imposes stringent requirements on the linear power amplifier design. Additional techniques that mitigate these problems are proposed in O. Tirkkonen and A. Hottinen, "Complex space-time block codes for four Tx antennas," Proc. Globecom 2000, November 2000, San Francisco, USA. Other methods proposed include a rate=1, orthogonal transmit diversity (OTD)+space-time transmit diversity scheme (STTD) four antenna method. L. Jalloul, K. Rohani, K. Kuchi, and J. Chen, "Performance Analysis of CDMA Transmit Diversity Methods," *Proceedings of IEEE Vehicular Technology Conference*, Fall 1999, and M. Harrison, K. Kuchi, "Open and Closed Loop Transmit Diversity at High Data Rates on 2 and 4 Elements," *Motorola Contribution* to 3GPP-C30-19990817-017. This method requires an outer code and offers second order diversity due to the STTD block (Alamouti block) and a second order interleaving gain from use of the OTD block. The performance of this method depends on the strength of the outer code. Since this method requires an outer code, it is not applicable to uncoded systems. For the case of rate=⅓ convolutional code, the performance of the OTD +STTD method and the Tarokh rate=¾ method ST block code methods are about the same. Another rate 1 method is proposed in O. Tirkkonen, A. Boariu, and A. Hottinen, "Minimal non-orthogonality rate 1 space-time block code for 3+Tx antennas," in Proc. ISSSTA 2000, September 2000. The method proposed in this publication attains high performance but requires a complex receiver.

It would be advantageous, therefore, to have a method and apparatus that provided the advantage of transmit diversity on greater than two antennas while at the same time not greatly increasing the complexity of system design.

SUMMARY OF THE INVENTION

The present invention presents a method and apparatus for non-zero complex weighting and space-time coding signals for transmission on multiple antennas. The method and apparatus provides expansion of an N×N' space-time block code, where N is the number of transmit paths and N' is the number of output symbols per transmit path, to a M×M' space-time block code, where M>N, generated by using repetition and non-zero complex weighting of the symbols within the N×N' space time block code, to allow transmission of the space time block code on a number M of diversity transmit paths. The diversity transmit paths may comprise separate antennas or beams. The temporal length of the larger code M', may equal the temporal length of the original code, N'. In the method and apparatus, a transform is performed on an input symbol stream, to generate a transform result comprising a space-time block code. The N output streams of the space-time block code, each consisting of N' output symbols, are then repeated and at least one of the repeated streams non-zero complex weighted over time to generate M streams of N' output symbols for transmission on M diversity transmit paths. The non-zero complex weighting may include phase shifting.

In an embodiment, N is at least 2 and M is at least 3. At least two of the N streams of N' output symbols, corresponding to the original N streams of N' output symbols, are then each transmitted on a first at least one antenna and at least one of the M−N non-zero complex weighted streams of N' symbols are transmitted on one of a second at least one antenna. The first at least one antenna and second at least one antenna may comprise of any one of the M antennas.

In another embodiment, the method and apparatus may be implemented in a transmitter having common or dedicated pilot channels that enable efficient channel estimation of the coefficients that are required to decode the space-time code. In this embodiment the common and dedicated pilot channels may be implemented alone or both together in the transmitter. In one alternative of this embodiment, training symbols are transmitted on N transmit diversity paths, making it possible to estimate the N independent diversity transmit paths. For this, a dedicated pilot channel code sequence may be multiplexed into each of the N streams of N' output symbols of the original space-time block code, to generate N streams of N' output symbols and pilot channel sequence. Repetition and non-zero complex weighting may then be applied to generate M phase shifted streams of N' symbols and pilot channel sequence. At least two of the N original streams of N' output symbols and pilot channel sequence are then transmitted on one of the first at least one antenna and at least one of the M−N complex weighted streams of N' output symbols and pilot channel sequence are transmitted on one of the second at least one antenna. Another way of enabling estimation of N channels is to transmit common pilot channels so that N common pilot channel are transmitted on each of the first at least one antenna, and M−N complex weighted copies of some of the N common pilot channels are transmitted on each of the second at least one antenna. The complex weighting factors used for the common channels on each of the second at least one antenna are the same as the ones used to construct the M−N additional complex weighted streams of N' output symbols from the original N streams of N' output symbols. In these embodiments, the receiver may or may not know the method used to expand the N×N' space-time block code to an M×N' space-time block code, and the temporal weighting sequences employed.

In other embodiments, where N is at least 2 and M may be at least 3, the pilot channels may be arranged to enable estimation of at least N+1 diversity transmit paths. At least one of the N streams of N' output symbols, corresponding to the original N streams of N' output symbols, are then each transmitted on a first at least one antenna and at least one of the M−N complex weighted streams of N' symbols are each transmitted on one of a second at least one antenna. Different common pilot channels are transmitted on each of the first at least one antenna and on at least one of the second at least one antenna. In these embodiments, the receiver needs at least partial knowledge of the method used to expand the N×N' space-time block code to an M×N' space-time block code, and the temporal weighting sequences employed.

Complex weighting in the various embodiments may be applied by applying a periodic or random complex weighting pattern to each of the symbol streams that are complex weighted. The relationship between the complex weights of the symbol streams transmitted on the various antennas may also be predefined.

BRIEF DESCRIPTION OF THE FIGURES

FIG. 5 shows a block diagram of portions of an embodiment of a receiver for use with the transmitter of FIG. 2 or the transmitter of FIG. 3;

FIG. 6 shows rake finger embodiment of STTD demodulator 508 of FIG. 5;

DETAILED DESCRIPTION OF THE INVENTION

Figure 1A:
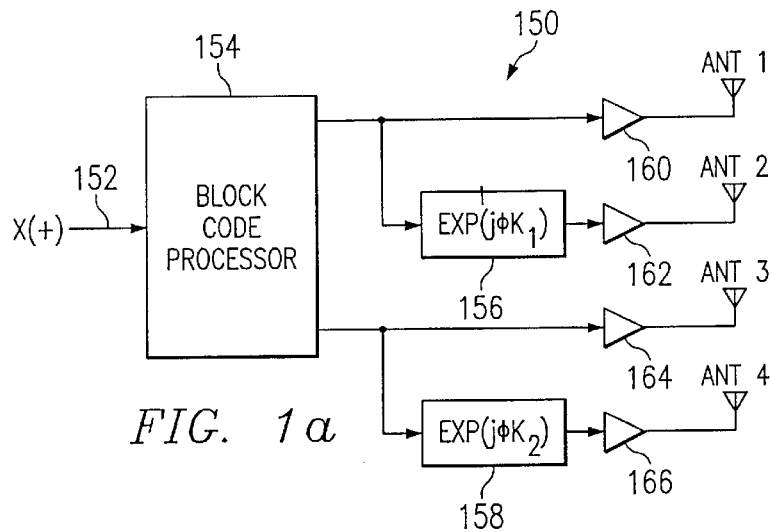
FIG 1a shows a block diagram of a transmitter according to an embodiment of the invention.

Referring now to FIG. 1a, therein is shown a block diagram of a transmitter 150 according to an embodiment of the invention. Transmitter 150 includes input 152 for receiving an input symbol stream, block code processor 154 for performing a transform on the input symbol stream to generate a transform result representable by an orthogonal space time block code and outputting 2 streams of symbols of the transform result, non-zero complex weighter 156 for non-zero complex weighting a first one of the two streams of symbols, a non-zero complex weighter 158 for non-zero complex weighting the second of the two streams of symbols, an RF transmitter 160 for transmitting the first stream of symbols on Ant. 1, RF transmitter 162 for transmitting the non-zero complex weighted stream of symbols on Ant. 2, RF transmitter 164 for transmitting the second stream of symbols on Ant. 3, and RF transmitter 166 for transmitting the phase shifted second stream of symbols on Ant. 4. The antennas Ant. 1–Ant. 4 may be polarized relative to one another to provide enhanced diversity reception. For example, Ant. 1 or Ant. 2 may be vertically polarized relative to a horizontal polarization of Ant. 3 or Ant. 4, respectively. The embodiment of transmitter 150 of FIG. 1a may be implemented in various forms suitable for different technologies and systems to expand a 2×N' block code for transmission over 4 transmit diversity paths. In transmitter 150, each of the 4 transmit diversity paths includes a separate antenna, Ant. 1–Ant. 4. This may include code division multiple access (CDMA) systems, time division multiple access (TDMA) systems, or any other type of digital communications system into which transmit diversity may be introduced. In an alternative of the embodiment of FIG. 1a, the non-zero complex weighting may be all performed on selected ones of the transmission paths to create relative phase shifts between the transmissions on Ant. 1 and Ant. 2 or on Ant. 3 and Ant. 4. For example, non-zero complex weighting could also be applied before the inputs to RF transmitters 160 and 164, creating a non-zero complex weighted version of each of the symbol streams, but maintaining a relative phase shift between the transmitted signals. An alternative of the embodiment of transmitter 150 may be implemented using less than 4 antennas, to implement the 4 diversity paths. As an example, the signals input to RF transmitters 164 or 166 may be connected together and transmitted on a single antenna. Also other alternatives are possible in which less than 4 diversity paths are used, for example, only one of the 2 data streams may be non-zero complex weighted and transmit on two diversity paths. In an alternative embodiment of FIG. 1a, the non-zero complex weighing operation may be performed after RF transmitter blocks 160, 162, 164, 166, i.e., non-zero complex weighing could be implemented as a continuous phase sweep after the modulation, and baseband filtering of Space-Time coded symbols.

Figure 15:
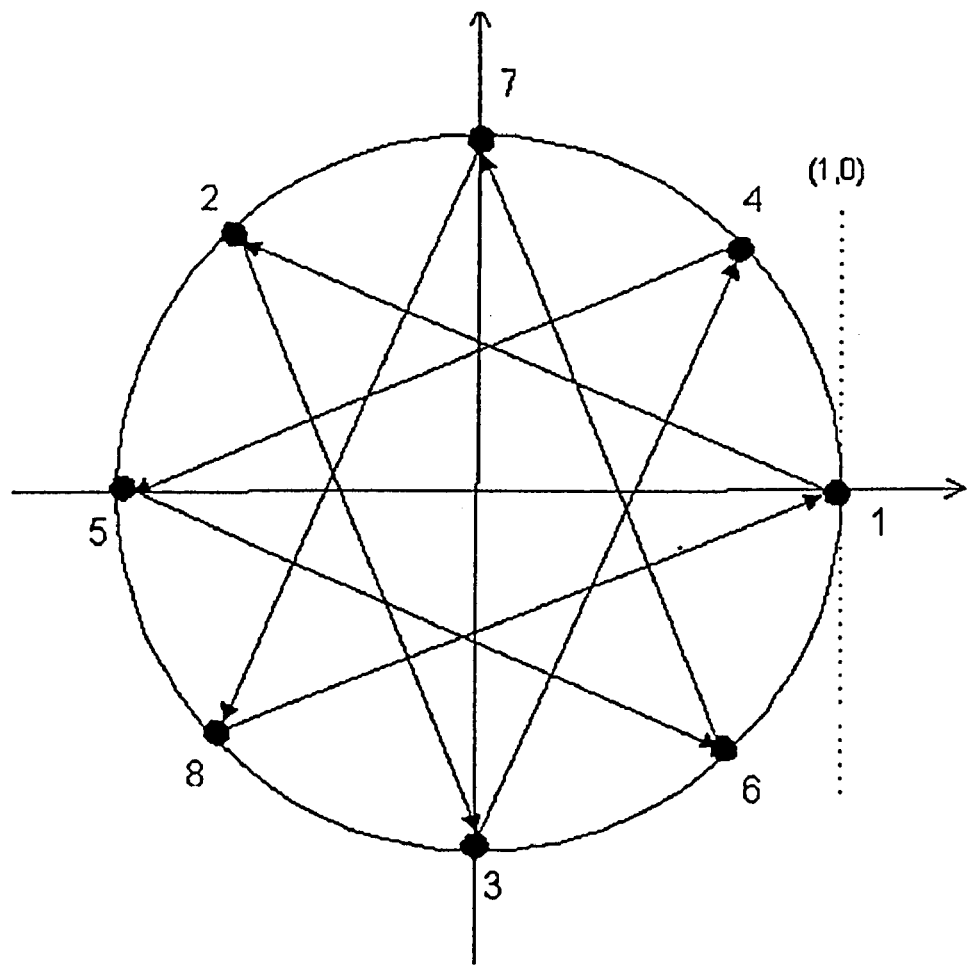
FIG. 15 shows a constellation defining a phase shifting pattern that may be used in various embodiments of the invention.

The non-zero complex weighting for these transmissions on Ant. 2 and Ant. 4 may be performed according to various alternatives. For example, a phase pattern $W_1(t)=\exp(j*pi*phase\_in\_degrees/180)$ used on Ant. 2 may be applied and the phase pattern $-W_1(t)$, which is 180 degrees out of phase with $W_1(t)$ may be used on Ant. 4. Examples of this would be a phase pattern of shifts in degrees of {0, 90, 180, 270} on Ant. 2 and {180, 270, 0, 90} on Ant. 4 for 4PSK constellation. Other example patterns {0, 45, 90, 135, 180, 225, 270, 315} for 8PSK and {0, 22.5, 45, 67.5, . . . 337.5} for 16PSK. FIG. 15 shows a constellation defining another phase shifting pattern that may be used in various embodiments of the invention. This sequence of shifts in degrees of {0, 135, 270, 45, 180, 315, 90, 225} may be transmitted on antenna 2 while using the pattern of shifts in degrees of {180, 315, 90, 225, 0, 135, 270, 45} on antenna 4. The phase shifting may be periodic or random. Periodic phase shifting refers to a predefined phase pattern for e.g. complex weight W1(t) repeated periodically. The complex weights can be defined so that the sequence of complex weights defines a maximal length path, to make successive samples of the effective channel as independent as possible. This can make interleaving redundant and thus enable low delay transmission. Pseudo-random phase shifting used may be a sequence of random phase selections from a MPSK constellation. Alternatively, another non-zero complex weighting scheme where the phase difference between successive phase states is as small as possible is advantageous when estimating channel coefficients or metrics related to power control from a non-zero complex weighted channel. In this case, the phase states may still cover 360 degrees during the duration of one encoding block. Channel interleaving may be used in the embodiments as in conventional systems. It is also possible to implement the non-zero complex weighting sequence and the interleaver jointly, so that the symbols at the output of the interleaver are as independent as possible. Furthermore, by changing the relative phase between antennas 1 and 2, and 3 and 4, respectively, the method can be implemented so that there is a phase shift or sweep in all antenna elements, but relative phase shifts between antennas 1 and 2, and 3 and 4 are maintained. As an example, with phase sweep, one may have a 50 Hz phase sweep on antenna 1 and −50 Hz phase sweep on antenna 2, in order to implement a 100 Hz effective sweep. Similarly for antennas 3 and 4.

The phase rotation may be changed every T seconds. The choice of T depends on total time duration of the data symbols and the method used for estimating the channel coefficients. The phase may be kept constant for the total time duration occupied by the data symbols within at least one space-time encoding block and the corresponding dedicated or common pilot sequence/training sequence can be used to enable proper channel estimation. The pilot sequence could be a walsh code, as used in CDMA systems, or sequence of training symbols with good correlation properties used for channel estimation in TDMA. The pilot symbols may apply the same non-zero complex weighting coefficients as the data within the space-time block. Alternatively, the pilots may be transmitted without phase hopping. In this case the effective channel for the data can be derived jointly from the a priori known hopping pattern and the channel estimate obtained from a non-hopping channel. In cases where non-zero complex weighting is applied to common pilots, the same or different phase pattern may be applied to both data and common pilots. Channel estimation using non-hopping pilot or training sequences (either transmitted on common or dedicated channels) provides better channel estimates as the channel is more stationary.

Figure 1B:
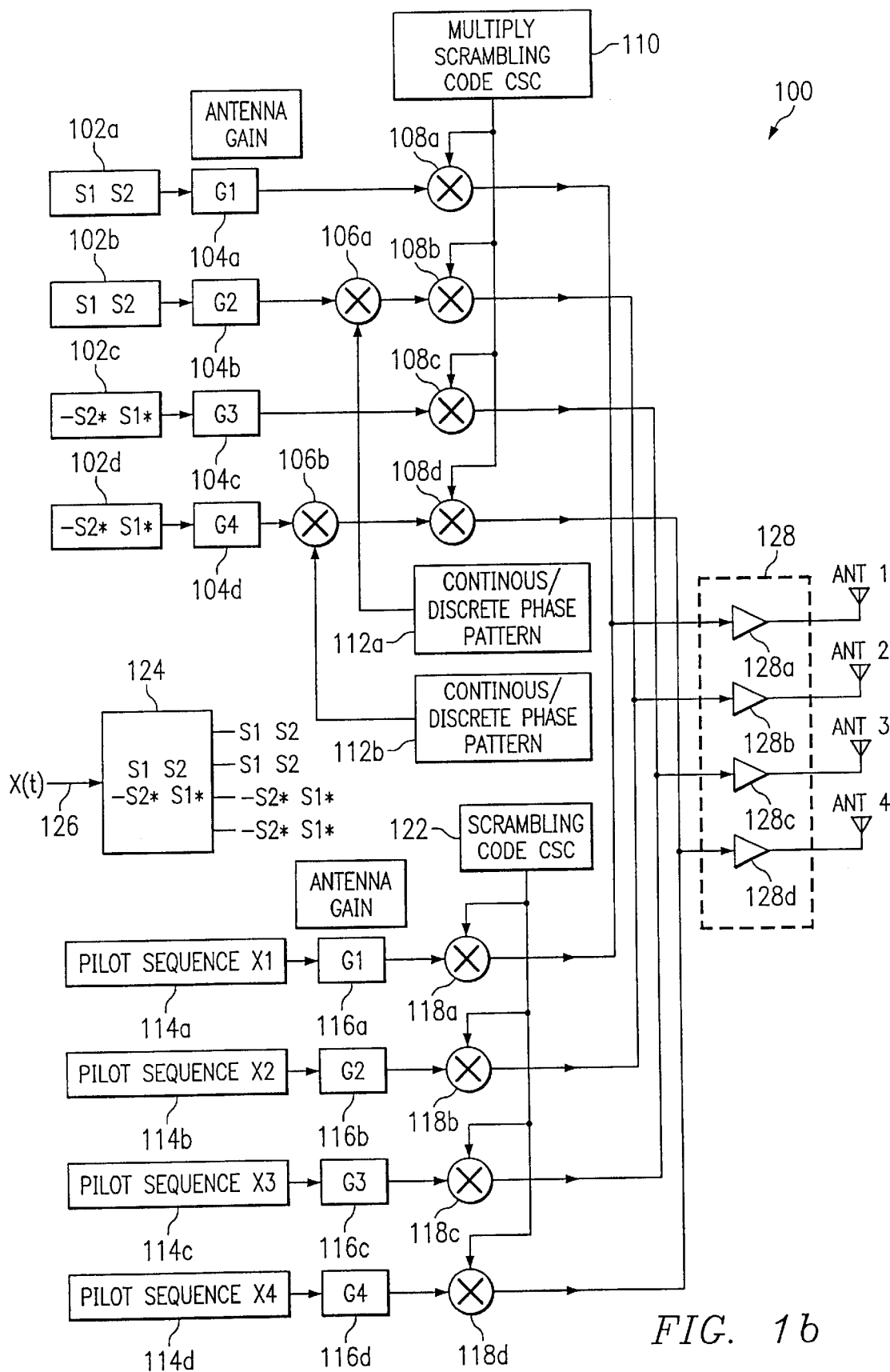
FIG. 1b shows a block diagram of portions of a common pilot channel STTD transmitter according to an embodiment of the invention.

Referring now to FIG. 1b, therein is a block diagram of portions of a common pilot channel space time transmit diversity (STTD) transmitter 100 according to an embodiment of the invention. Transmitter 100 may operate as a 4-antenna transmit diversity extension to release 99 of the wideband CDMA (WCDMA) third generation system standard. Transmitter 100 comprises input 126, block code processor 124, traffic channel symbol stream processing branch inputs 102a–102d, antenna gain blocks 104a,–104d, phase shifters 106a and 106b, phase shifter inputs 112a and 112b, Code multipliers 108a–108d, pilot sequence processing branch inputs 114a–114d, antenna gain blocks 116a–116d, code multipliers 118a–118d, RF transmitter 128, including RF transmitters 128z–128d, and antennas Ant. 1–Ant. 4.

In FIG. 1b, data to be transmitted including a channel coded and interleaved input symbol stream X(t) comprising the symbols S1S2 is received at input 126. Block code processor 124 performs a transform on every two received symbols S1S2 to generate a transform result comprising a 2×2 orthogonal space-time block code. In the embodiment, block code processor 124 may perform an Alamouti transform to generate the block code in the form represented by the following matrix:

$$\begin{bmatrix} S_1 & S_2 \\ -S_2^* & S_1^* \end{bmatrix} \quad (1)$$

The matrix is then divided into 4 streams of 2 symbols with each of the streams being input to one of the traffic channel symbol stream processing branch inputs 102a–102d. As shown in FIG. 1, the stream S1S2 is input to 102a, S1S2 is input to 102b, −S2*S1* in input to 102c, and to −S2*S1* is input to 102d. The non-zero complex weighting is performed by antenna gain blocks 104a–104d and phase shifters 106a and 106b. Antenna gain for each of the processing branches is adjusted in antenna gain blocks 104a–104d. After antenna gain is adjusted, phase shifters 106a and 106b apply a phase shift to the stream S1S2 output from antenna gain block 104b and stream −S2*S1* output from antenna gain block 104d. The phase shifter control blocks 112a and 112b may control phase shifters 106a and 106b by causing shifting using a continuous or discrete phase hopping pattern. A CDMA scrambling code is then input to code multipliers 108a–108d to generate the stream S1S2 to RF transmitter 128a for transmission on Ant. 1, S1S2 (exp(jϕk1)) to RF transmitter 128b for transmission Ant. 2, −S1*S2* to RF transmitter 128c for transmission on Ant. 3 and −S2*S1* (exp(jϕk2)) to RF transmitter 128d for transmission on Ant. 4. The RF transmitters may perform of baseband pulse shaping, modulation, and carrier up conversion. In some implementations one may choose to apply phase hopping or sweep after baseband pulse shaping and modulation steps.

Common pilot channel sequences X1–X4 are input to pilot sequence processing branch inputs 114a–114d. The pilot sequences are then separately processed through antenna gain blocks 116a–116d, and code multipliers 118a–118d. The coded outputs from code multipliers 118a–118d are then input to RF transmitters 128a–128d, respectively, of RF transmitter 130.

The pilot sequence X1 is then transmit on Ant. 1, the pilot sequence X2 is transmit on Ant. 2, the pilot sequence X3 is transmit on Ant. 3, and the pilot sequence X4 is transmit on Ant. 4.

Figure 4:
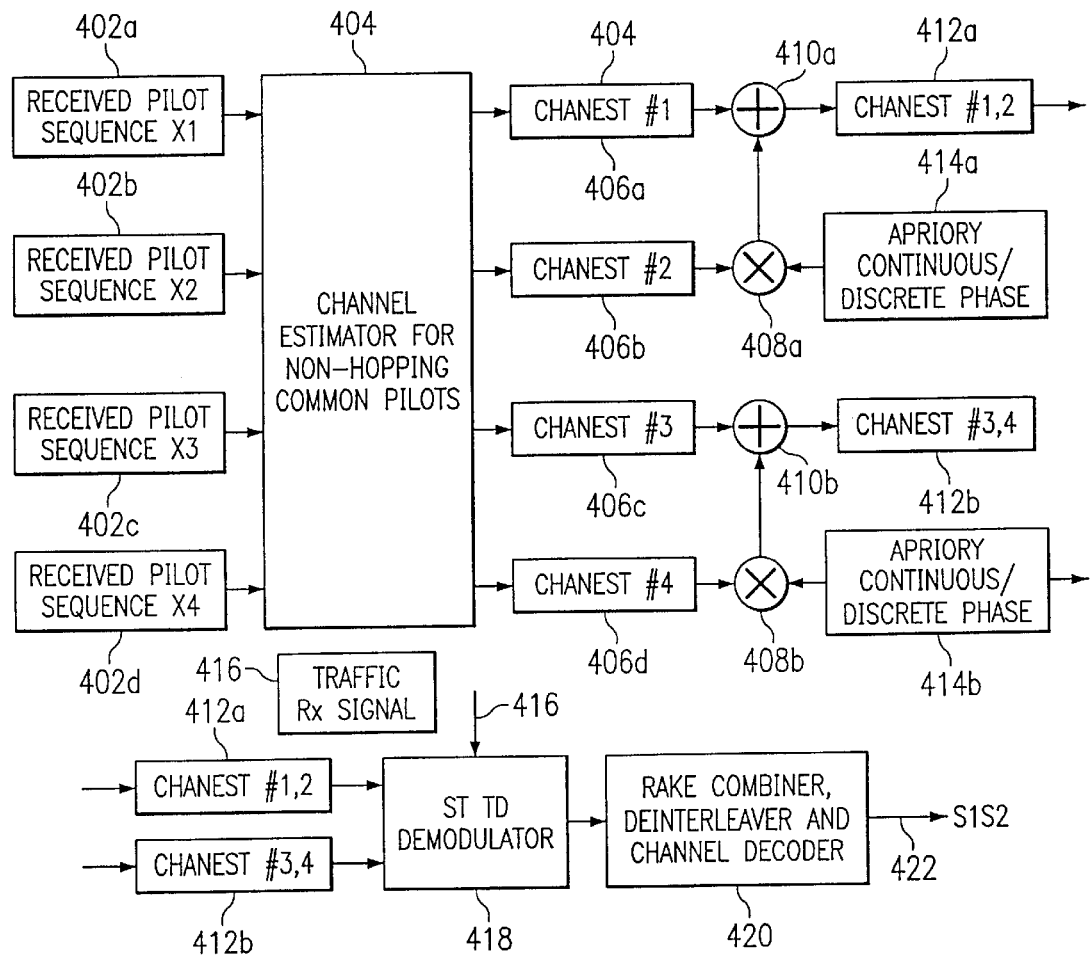
FIG. 4 shows a block diagram of portions of an embodiment of a receiver for use with the transmitter of FIG. 1.

Referring now to FIG. 4, therein is a block diagram of portions of a receiver for use with transmitter 100 of FIG. 1b. FIG. 4 shows the signal processing for one rake finger receiver section of a receiver. The received pilot sequences X1–X4 transmit from transmitter 100 are received and input to channel estimation processing branch 402a–402d, respectively. Channel estimator 404 then performs a channel estimation function, for example a low pass filter moving average function, for each of channel 1–channel 4. The estimates of channel 1–channel 4 are then output from outputs 406a–406d to summer 410a, phase shifter 408a, summer 410b and phase shifter 408b. Phase shifter 408a receives input from phase shifter control block 414a and shifts the estimate for channel 2 by the same phase shift used on the traffic channel symbols S1S2 transmit from Ant. 2 in transmitter 100. Phase shifter 408b receives input from phase shifter control block 414b shifts the estimate for channel 4 by the same phase shift used on the traffic channel symbols −S2* S1* transmit from Ant. 4 in transmitter 100. The phase shifted version of the estimate for channel 2 is combined with the estimate for channel 1 by summer 410a,and the phase shifted version of the estimate for channel is combined with the estimate for channel 3 in summer 410b. The combined estimate for channels 1 and 2 (412a) and the combined estimate for channel 3 and 4 (412b) are then input to STTD demodulator 418, which processes the received traffic signals from input 416 using the channel estimates. The demodulated signal is then processed in rake combiner, deinterleaver and channel decoder 420 to generate the received symbols S1S2.

Figure 2:
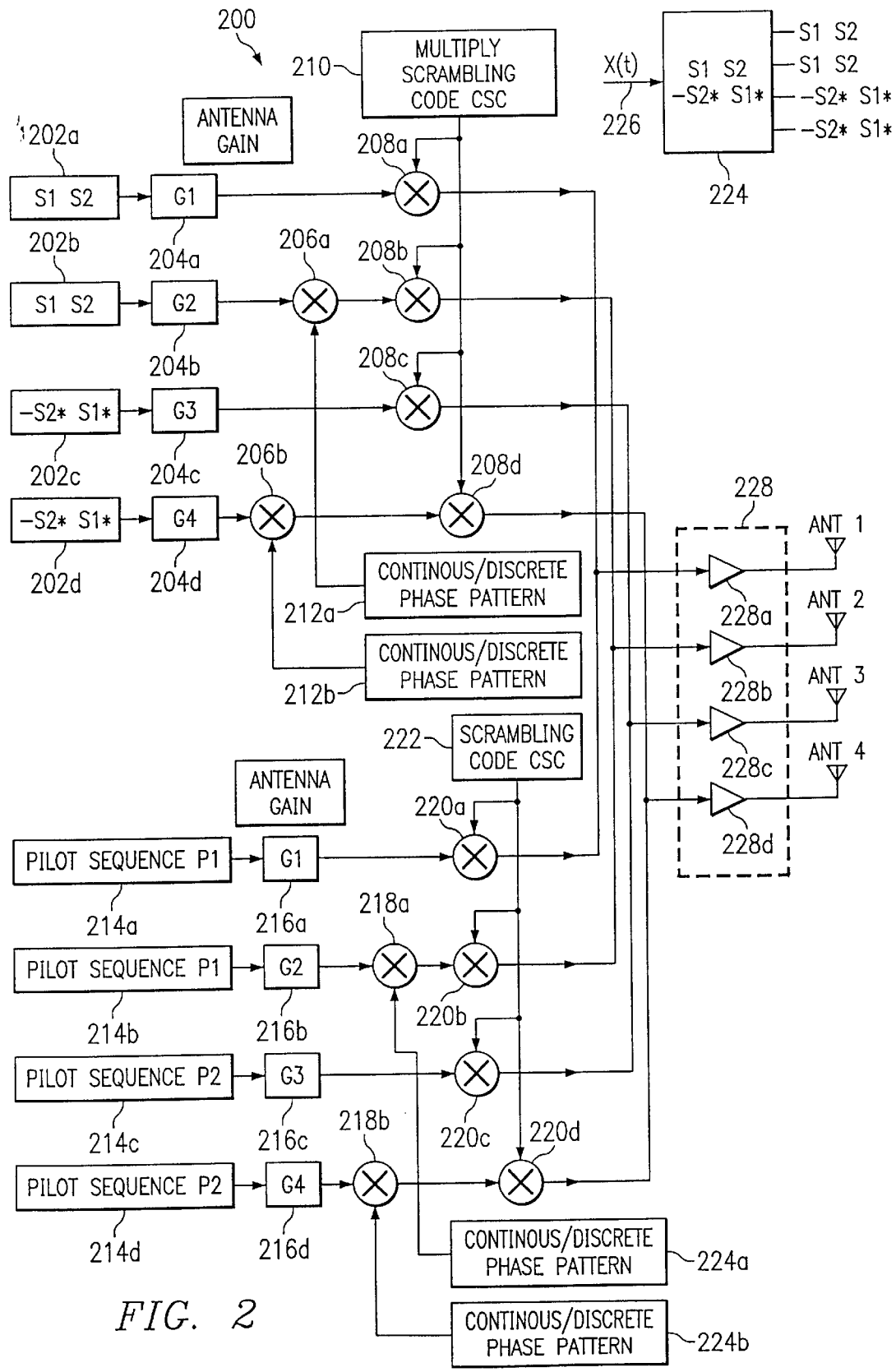
FIG. 2 shows a block diagram of portions of a common pilot channel STTD transmitter according to another embodiment of the invention.

In an alternative common pilot channel embodiment for 4-antenna diversity, common pilot channels are phase shifted in the same manner as the traffic channels before transmission. Referring now to FIG. 2, therein is a block diagram of portions of a common pilot channel STTD transmitter 200 according to another embodiment of the invention. Transmitter 200 comprises input 226, block code processor 224, traffic channel symbol stream processing branch inputs 202a–202d, antenna gain blocks 204a, −204d, phase shifters 206a and 206b, phase shifter inputs 212a and 212b, Code multipliers 208a–208d, Code multiplier input 210, pilot sequence processing branch inputs 214a–214d, antenna gain blocks 216a–216d, phase shifters 218a and 218b, phase shifter control blocks 224a and 224b, code multipliers 220a–220d, code multiplier input 222, RF transmitter 228, including RF transmitters 228a–228d, and antennas Ant 1–Ant. 4.

The traffic channel processing and transmission in transmitter 200 is performed in the same manner as used for the traffic channel processing in transmitter 100 of FIG. 1. Transmitter 200, however, uses common pilot channels, which are phase shifted. Common pilot channel sequence P1 is input to pilot sequence processing branch inputs 214a and 214b and common pilot channel sequence P2 is input to pilot sequence processing branch inputs 214c and 214d. The pilot sequences are then separately processed through antenna gain blocks 216a–216d. The pilot sequence P1 output from antenna gain block 216a is input to code multiplier 220a. The pilot sequence P2 output form antenna gain block 216c is input to code multiplier 220c. Pilot sequence P1 output from antenna gain block 216b is input to phase shifter 218a. Pilot sequence P2 output from antenna gain block 216d is input to phase shifter 218b. Phase shifter 218a and 218b apply a phase shift under the control of phase shifter control block 224a and 224b, respectively. The phase shift may be the same continuous or discrete phase hopping pattern used for the traffic channels. The phase shifted pilot sequence P1 output from phase shifter 218a is then input to code multiplier 220b and the phase shifted pilot sequence P2 output from phase shifter 218b is then input to code multiplier 220d. The coded pilot sequence P1 output from code multiplier 220a is then input to RF transmitter 228a for transmission on Ant. 1. The coded phase shifted pilot sequence P1 output from code multiplier 220b is input to RF transmitter 228b for transmission on Ant. 2, the coded pilot sequence P2 output from code multiplier 220c is input to RF transmitter 228c for transmission on Ant. 3, and the coded phase shifted pilot sequence P2 output from code multiplier 220d is input to RF transmitter 228d for transmission on Ant. 4.

The phase shifting performed by phase shifters 218a and 218b may according to various alternatives, for example, as described for the phase shifting performed in the embodiment of FIG. 1.

Referring now to FIG. 5, therein is a block diagram of portions of an embodiment of a receiver 500 for use with the transmitter of FIG. 2. Receiver 500 comprises channel 1 and channel 2 estimate processing branch input 502a and channel 3 and channel 4 estimate processing branch input 502b, channel estimator 504, STTD demodulator 508, traffic signal input 510 and rake combiner, deinterleaver and channel decoder 512.

The received pilot sequence P1 (ch1+ch2Ø) received on channels 1 and 2 from Ant. 1 and Ant. 2, respectively, of transmitter 200 is input to input 502a. The received pilot sequence P2 (ch3+ch4Ø) received on channels 3 and 4 from Ant. 3 and Ant. 4, respectively, of transmitter 200 is input to input 502b. Channel estimator 504 performs channel estimation using, for example, a low pass filter moving average function, and outputs combined estimate for channels 1 and 2 (chest 1,2), and a combined estimate for channels 3 and 4 (chest 3,4). The channel estimates are then input to STTD demodulator 508, which processes the received traffic signals from input 510 using the channel estimates. The demodulated signal is then processed in rake, combiner, deinterleaver and channel decoder 512 to generate the received symbols S1S2. FIG. 6 shows an embodiment of a rake finger of STTD demodulator 508 of FIG. 5 that utilizes chest 1,2 and chest 3,4 for demodulating the received traffic signals.

Figure 3:
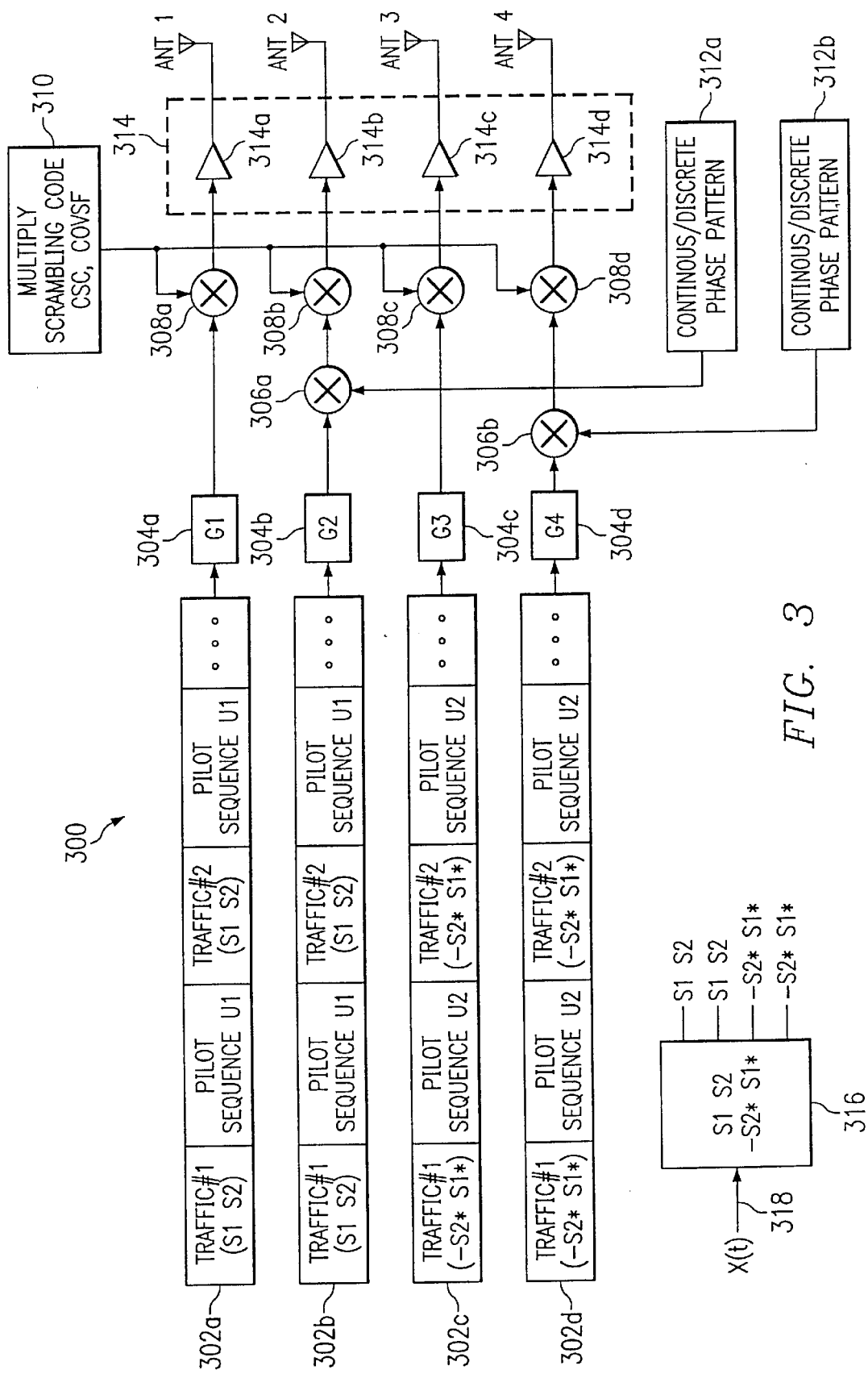
FIG. 3 shows a block diagram of portions of a dedicated pilot channel STTD transmitter according to a further embodiment of the invention.

In another embodiment for 4-antenna diversity, dedicated pilot channels may be implemented in a WCDMA version of transmitter 150 of FIG. 1. Referring now to FIG. 3, therein is a block diagram of portions of a dedicated pilot channel STTD transmitter 300 according to a further embodiment of the invention Transmitter 300 comprises input 318, block code processor 316, channel symbol stream processing branch inputs 302a–302d, antenna gain blocks 304a,–304d, phase shifters 306a and 306b, phase shifter inputs 312a and 312b, code multipliers 308a–308d, code multiplier input 310, and antennas Ant. 1–Ant 4.

Transmitter 300 of FIG. 3 is an implementation that uses dedicated pilot channels that are transmitted by embedding pilot sequences in the traffic channel symbol stream. Input 318 and block code processor 316 function in the same manner as input 126 and block code processor 124 of FIG. 1. In transmitter 300, as symbols S1S2 are input to symbol stream processing branch inputs 302a and 302b, pilot channel sequence U1 is input into inputs 302a and 302b multiplexed between the symbol sets of S1S2. Also, –S2*S1* is input to symbol stream processing branch inputs 302c and 302d, and pilot channel sequence U2 is input onto inputs 302c and 302d, and multiplexed between the symbol sets of –S2*S1*. Another possibility is to define 4 different dedicated pilot sequences, one for each transmit antenna.

The multiplexed symbol streams at inputs 302a–302d are then input to antenna gain blocks 304a–304d, respectively. Channel gain is applied in antenna gain blocks 304a–304d. The stream comprising S1S2 and pilot sequence U1 is output from antenna gain block 304a to code multiplier 308a. The stream comprising S1S2 and pilot sequence U1 is output from antenna gain block 304b to phase shifter 306a, where it is phase shifted according to input from phase shifter control block 312a and then input to code multiplier 308b. The stream comprising –S2*S1* and pilot sequence U2 is output from antenna gain block 304c to code multiplier 308c, and the same stream, –S2*S1* and pilot sequence, is output from antenna gain block 304d to phase shifter 306b, where it is phase shifted according to input from phase shifter control block 312b and then input to code multiplier 308d. Code multipliers 308a–308 d multiply the appropriate stream by a scrambling code. The code multiplied stream S1S2 and pilot sequence U1 is then input to RF transmitter 314a for transmission on Ant. 1. The code multiplied phase shifted stream S1S2 and pilot sequence U1 is input to RF transmitter 314b for transmission on Ant. 2. The code multiplied stream –S2*S1* and pilot sequence U2 is input to RF transmitter 314c for transmission on Ant. 3, and the code multiplied phase shifted stream –S2*S1* and pilot sequence U2 is input to RF transmitter 314d for transmission on Ant. 4. RF transmitter 314a–314d perform modulation and carrier up conversions before transmitting the streams on Ant. 1–Ant. 4. The RF transmitters may perform of baseband pulse shaping, modulation, and carrier up conversion. In some implementations one may choose to apply the non-zero weighting after baseband pulse shaping and modulation.

The receiver of FIG. 5 may be modified for use with transmitter 300 of FIG. 3. In this case, receiver 500 would function similarly but inputs 502a and 502b would input U1 (Ch1+Ch2Ø) and U2(Ch3+Ch4Ø), respectively, to channel estimator 504c.

Figure 12:
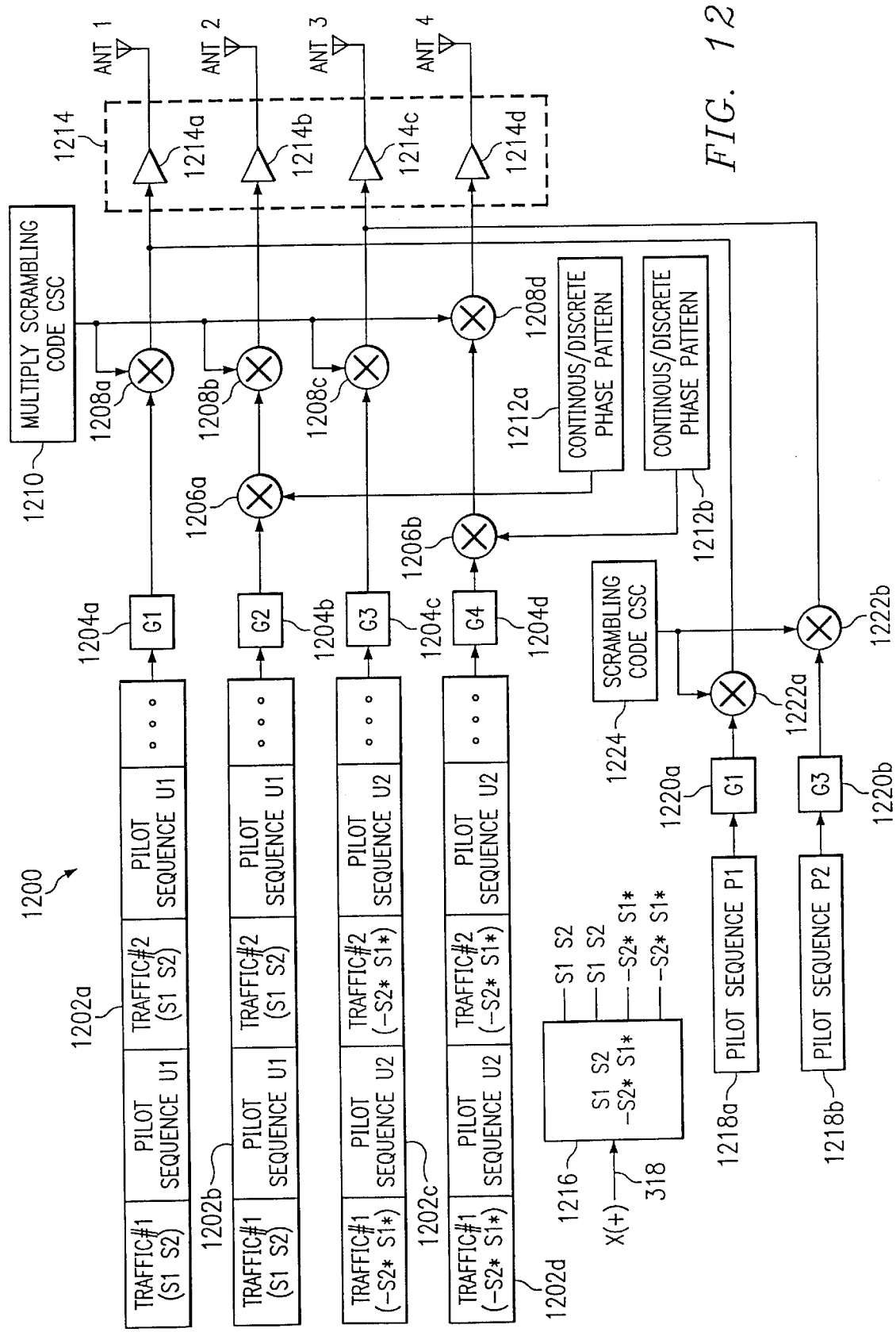
FIG. 12 shows a block diagram of portions of a common/dedicated pilot channel STTD transmitter according to another embodiment of the invention.

In another embodiment for 4 antenna diversity, dedicated pilot channels and common pilot channels may be implemented in a combined embodiment. Referring now to FIG. 12, therein is a block diagram of portions of a dedicated/common pilot channel STTD transmitter 1200 according to another embodiment of the invention.

Transmitter 1200 functions essentially in the same manner as transmitter 300 of FIG. 3 with the exception being that common pilot channels are added on Ant. 1 and Ant. 3. Common pilot channel sequences P1 and P2 are input to pilot sequence processing branch inputs 1218a and 1218b, respectively. The pilot sequences are then separately processed through antenna gain blocks 1220a and 1220b, and code multipliers 1222a and 1222b. The coded outputs from code multipliers 222a and 1222b are then input to RF transmitters 1214a and 1214c, respectively, of RF transmitter 1214. The RF transmitters may perform baseband pulse shaping, modulation, and carrier up conversions. In some implementations one may choose to apply the non-zero weighting after baseband pulse shaping and modulation.

Transmitter 1200 of FIG. 12 provides non-hopped common pilot channels on Ant. 1 and Ant. 3 and dedicated pilot channels on Ant. 1, Ant. 2, Ant. 3, and Ant. 4. The pilot sequences may be multiplexed within one slot, for example in an embodiment where there are 15 slots in a transmission frame. Antenna gains may be set different for the common and dedicated control channels. The antenna gains can also be time varying.

Figure 13:
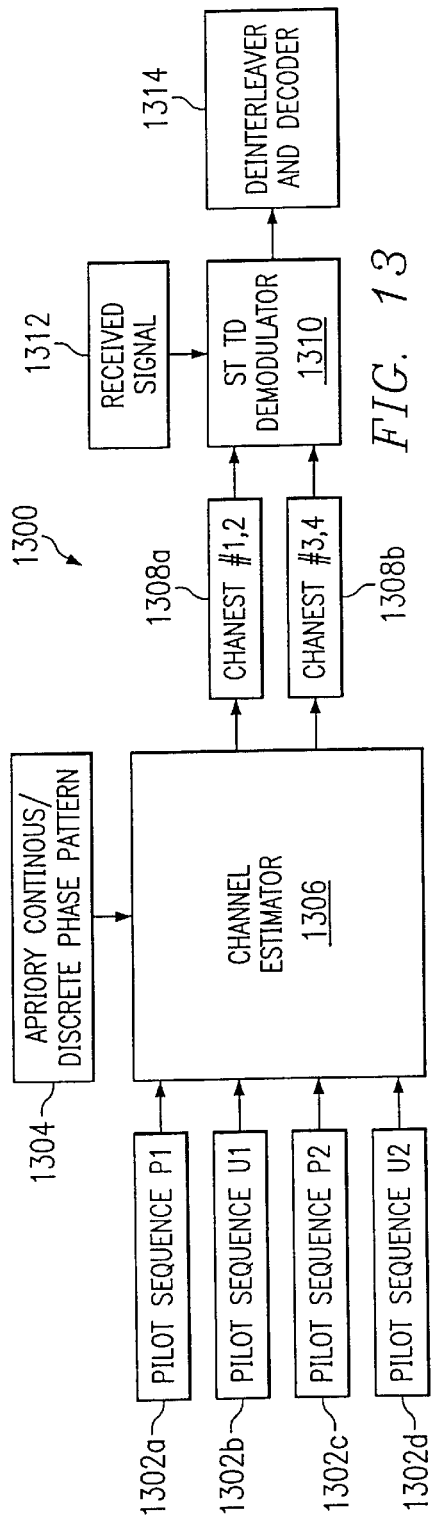
FIG. 13 shows a block diagram of portions of a receiver for use with the transmitter of FIG. 12.

Referring now to FIG. 13, therein is a block diagram of portions of a receiver 1300 for use with the transmitter of FIG. 12. Receiver 1300 comprises channel 1 and channel 2 processing branch having inputs 1302a and 1302b, and channel 3 and channel 4 processing branch having inputs 1302c and 1302d. Phase shifter input 1304, channel estimator 1306, STTD demodulator 1310, traffic signal input 312, and deinterleaver and decoder 1314.

The received pilot sequences P1, U1, P2, and U2 and input to inputs 1302a, 1302b, 1302c, and 1302d, respectively, of receiver 1300. Channel estimator 1306 performs channel estimation using, for example, a low pass filter having average function, and outputs a combined estimate for channels 1 and 2 (chest 1,2) 1308a, and a combined estimate for channels 3 and 4 (chest 3,4) 1308b. The channel estimates are then input to STTD demodulator 1310, which processes the received traffic signals from input 1312 using the channel estimates. The demodulated signal is then processed in rake, combiner, deinterleaver, and channel decoder 1314 to generate the received symbols S1, S2.

Figure 14:
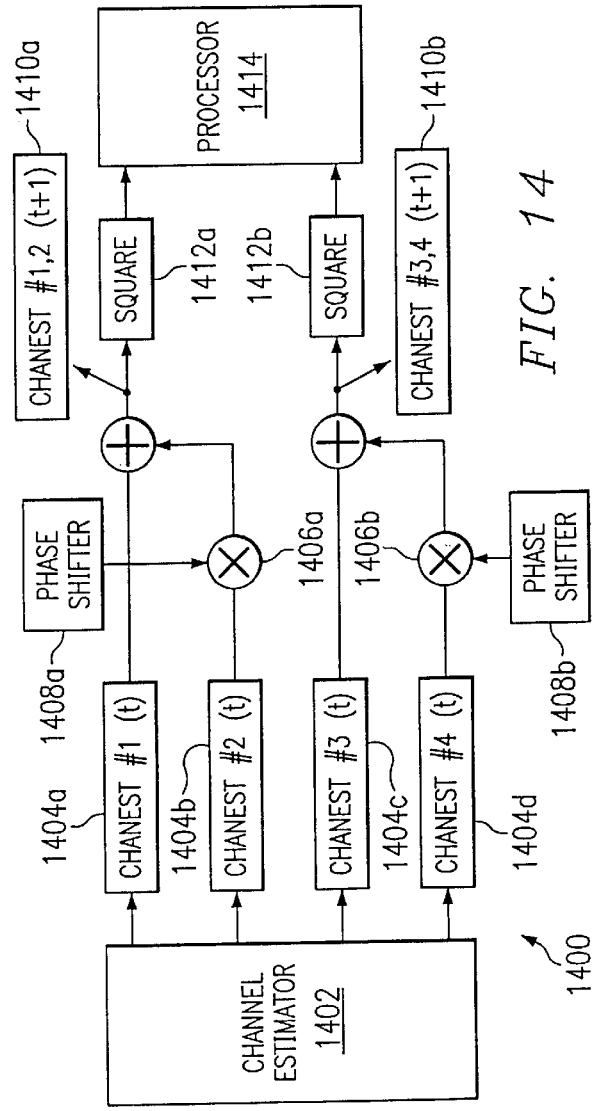
FIG. 14 shows a block diagram of portions of a receiver for use in power control of the transmitter of FIG. 12.

A prior knowledge of the phase hopping may be used for power control purposes. Referring now to FIG. 14, therein are shown portions of a receiver for estimating power control, according to an embodiment of the invention. Receiver 1400 includes channel estimator 1402, channel estimating branch inputs 1404a–1404d, phase shifter inputs 1408a and 1408b, phase shifter 1406a and 1406b, channel estimate output 1410a and 1410b, squaring blocks 1412a and 1412b, and power control processor 1414.

Channel estimator 1402 computes channel coefficients from the common or dedicated channels from, for example transmitter 1200, for all four antennas during a given slot "t". This may be a channel prediction for slot t+1, alternatively the channel estimate for slot t may be used in slowly fading channels. These channel coefficients are denoted by chanest#1(t), chanest#2(t), chanest#3(t), and chanest#4(t) at inputs 1404a–1404d, respectively. For multiple rake fingers, e.g. chanest#1(t) is a vector channel estimate corresponding to all rake fingers from Ant. 1.

Using the prior knowledge of phase hopping in phase shifter inputs 1408a and 1408b and knowledge of channel estimate for the current slot "t", channel coefficients for slot "t+1" are estimated:

$$\text{chanest\#12}(t+1) = \text{chanest\#1}(t) + \text{chanest\#2}(t)e^{\phi 12(t+1)}$$

$$\text{chanest\#34}(t+1) = \text{chanest\#3}(t) + \text{chanest\#4}(t)e^{\phi 34(t+1)} \quad (2)$$

Where $\phi 12$, $\phi 34$ are known a priority.
Received signal power estimate for slot (t+1) can be done based on chanest #12(t+1) and chanest #12(t+1);

$$\text{received\_power}(t+1) = \|\text{chanest\#12}(t+1)\|^2 + \|\text{chanest \#34}(t+1)\|_2$$

A power control command is generated by processor 1414 using the received power estimate.

Figure 7:
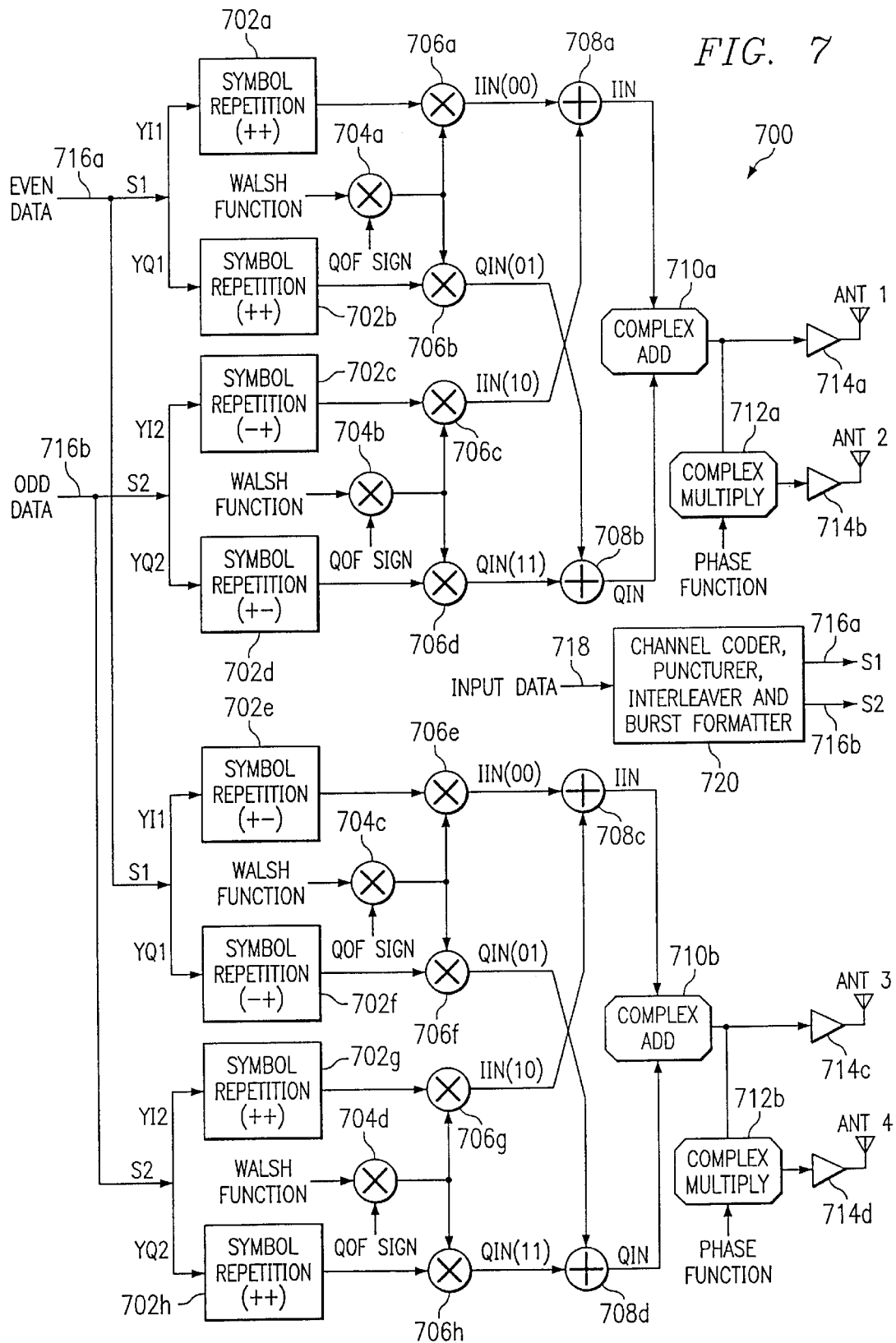
FIG. 7 shows a block diagram of portions of an STS transmitter according to an embodiment of the invention.

The method and apparatus of the invention may also be implemented with diversity in the Walsh code domain. Referring now to FIG. 7, therein is a block diagram of portions of an space time spreading (STS) transmitter 700 according to an embodiment of the invention;

Transmitter 700 is a STS embodiment of transmitter 150 of FIG. 1a in which the space time block processor performs the transform in the Walsh Code domain. The STS block code matrix used may be represented as:

$$\begin{bmatrix} S1\tilde{W}_1 - S2^*\tilde{W}_2 \\ S2\tilde{W}_1 + S1^*\tilde{W}_2 \end{bmatrix} \text{ where } \tilde{W}_1 = [W_1 \ W_1] \quad \tilde{W}_2 = [W_1 \ -W_1] \quad (3)$$

As is done for the embodiment of FIG. 1a, each row of the matrix and its phase shifted version are each transmitted on separate antennas Ant. 1–Ant. 4. The symbols S1 and S2 in each row are each transmitted simultaneously over two symbol periods, rather than sequentially. Data symbols are input to transmitter 700 at input 718 of channel coder 720. Channel coder 720 codes, punctures, interleaves, and formats the input data symbols and outputs every other coder output symbol S1 as even data and every other coder output symbol S2 as odd data. The even data is then processed through symbol repetition blocks 702a,b,e,f, Walsh function blocks 704b and 704d, Walsh multipliers 706a,b,e,f, summers 708a–708d and complex adders 710a and 710b. The odd data is processed through symbol repetition blocks 702c,d,g,h, Walsh function blocks 704b and 704d, Walsh multipliers 706c,d,g,h, summers 708a–708d, and complex adders 710a and 710b. The result at the output of complex adder 710a is the matrix row $S1\tilde{W}_1 - S2^*\tilde{W}_2$ and the result at the output of complex adder 710b is the matrix row $S2\tilde{W}_1 + S1^*\tilde{W}_2$.

$S1\tilde{W}_1 - S2^*\tilde{W}_2$ is then input to complex multiplier 712a to generate $\{S1\tilde{W}_1 - S2^*\tilde{W}_2\}e^{j\Phi 1}$ and $S2\tilde{W}_1 + S1^*\tilde{W}_2$ is input to complex multiplier 712b to generate $\{S2\tilde{W}_1 + S1^*\tilde{W}_2\}e^{j\Phi 2}$. S1 $\tilde{W}_1 - S2^*\tilde{W}_2$ is then input to RF transmitter 714b for transmission on Ant. 1, $\{S1\tilde{W}_1 S2^*\tilde{W}_2\}e^{j\Phi 1}$ is input to RF transmitter 714b for transmission on Ant. 2, $S2\tilde{W}_1 + S1^*\tilde{W}_2$ is input to RF transmitter 714c for transmission on Ant. 3., and $\{S2\tilde{W}_1 + S1^*\tilde{W}_2\}e^{j\Phi 2}$ is input to RF transmitter 714d for transmission on Ant. 4.

Figure 9:
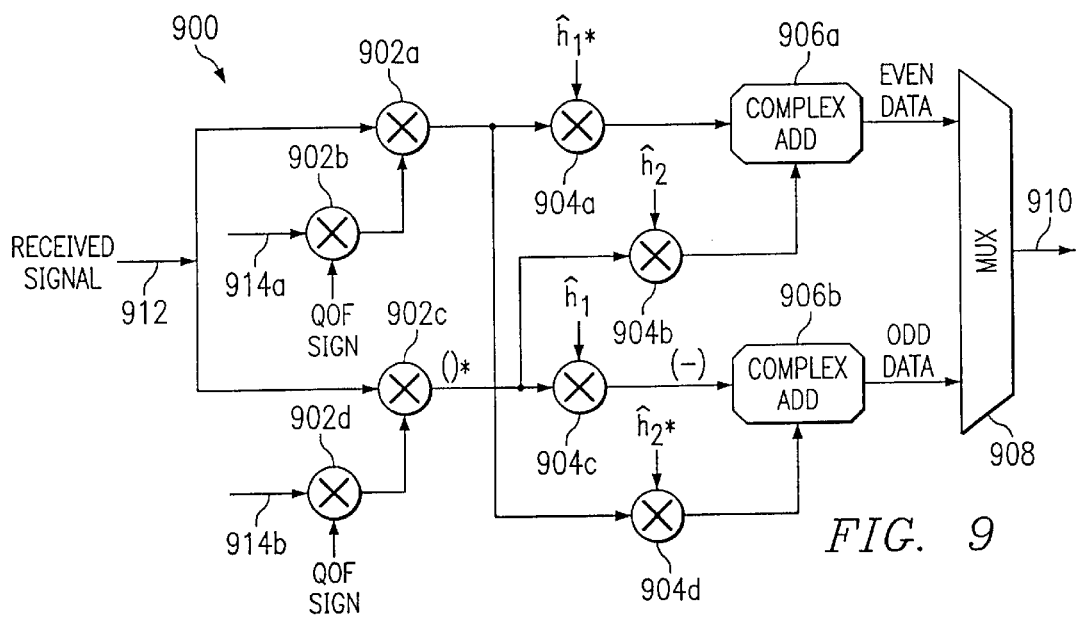
FIG. 9 shows a block diagram of portions of an embodiment of a receiver for use with the transmitter of FIG. 7.

Referring now to FIG. 9, therein is shown a block diagram of portions of an embodiment of a receiver 900 for use with transmitter 700 of FIG. 7. Transmitter 700 comprises input 912, Walsh function blocks 902b and 902d, Walsh multipliers 902a and 902c, channel multipliers 904a–904d, complex adders 906a and 906b, multiplexer (Mux) 908, and output 910. A received input signal is received at input 912, is processed by the STS demodulator. The pilot channel transmission and channels estimation procedures can be same as explained in STTD case. The channel estimates 904c and 904b can be same as 412a, 412b from FIG. 4 for non-hopping common pilot channel case. For the case of hopping common pilots or dedicated pilot transmission the channel estimates can be obtained from channel estimation block 504 from FIG. 5. These channel estimates are input to the STS demodulator in FIG. 9 as h1 and h2. h1 corresponds to combined channel estimate from Ant. 1, Ant. 2 and h2 corresponds to channel estimate from Ant. 3, Ant 4. After STS demodulation using 902a,b,c,d and 904a,b,c,d, and 906a,b the output from 908 is the STS demodulated signal to be sent to rake combiner, deinterleaver, and channel decoder block 512 from FIG. 5.

Figure 8:
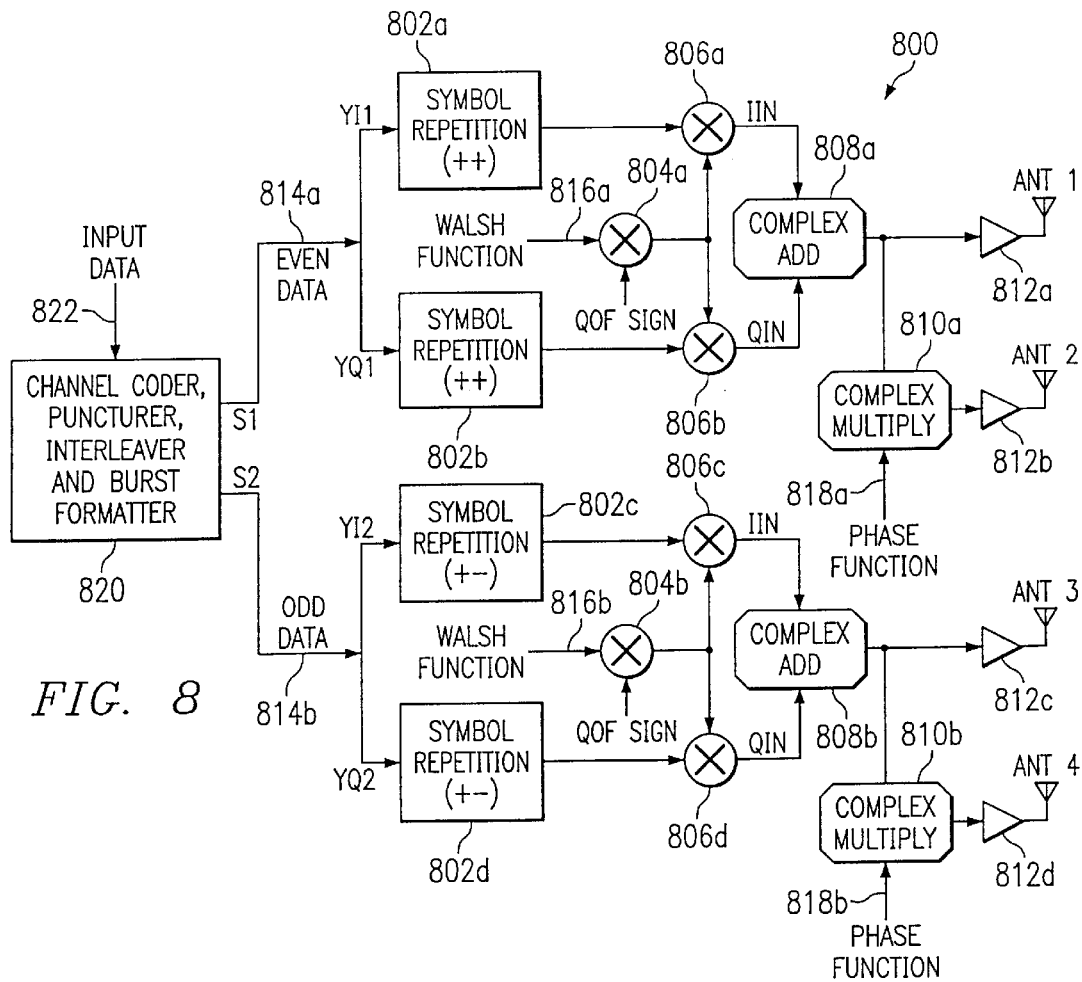
FIG. 8 shows a block diagram of portions of an OTD transmitter according to an embodiment of the invention.

The proposed invention can also be implemented in an orthogonal transmit diversity (OTD) embodiment of the invention. Referring now to FIG. 8, therein is a block diagram of portions of an OTD transmitter 800 according to an embodiment of the invention. Transmitter 800 comprises input 822, channel coder 820, symbol repetition blocks 802a–802d, Walsh function blocks 804a and 804b, Walsh multipliers 806a–806d, complex adders 808a–808b, complex multipliers 810a and 810b, RF transmitters 812a–812d. Transmitter is an orthogonal transmit diversity (OTD) embodiment of transmitter 150 of FIG. 1a in which the space time block processor performs the transform in the Walsh code domain. The OTD block code matrix used may be represented as:

$$\begin{bmatrix} S1\tilde{W}_1 \\ S2\tilde{W}_2 \end{bmatrix} \text{ where } \tilde{W}_1 = [W_1 \ W_1] \quad \tilde{W}_2 = [W_1 \ -W_1] \quad (4)$$

As is done for the embodiment of FIG. 1a, each row of the matrix and its phase shifted version are each transmitted on separate antennas Ant. 1–Ant. 4. Data symbols are input to transmitter 800 at input 822 of channel coder 820. Channel coder 820 codes, punctures, interleaves, and formats the input data symbols and outputs every other coder output symbol S1 as even data and every other coder output symbol S2 as odd data. The even data is then processed through symbol repetition blocks 802a and 802b, Walsh function block 804a, Walsh multipliers 806a and 806b, and complex adder 808a. The odd data is processed through symbol repetition blocks 802c and 802d, Walsh function block 804b, Walsh multipliers 806c and 806d, and complex adder 808b. The result at the output of complex adder 808a is $S1\tilde{W}_1$ and the result at the output of complex adder 808b is $S2\tilde{W}_2$. $S1\tilde{W}_1$ is then input to complex multiplier 818a to generate $\{S1\tilde{W}_1\}e^{j\Phi 1}$ and $S2\tilde{W}_2$ is input to complex multiplier 818b to generate $\{S2\tilde{W}_2\}e^{j\Phi 2}$. $S1\tilde{W}_1$ is then input to RF transmitter 812a for transmission on Ant. 1, $\{S1\tilde{W}_1\}e^{j\Phi 1}$ is input to RF transmitter 812b for transmission on Ant. 2, $S2\tilde{W}_2$ is input to RF transmitter 812c for transmission on Ant. 3, and $\{S2\tilde{W}_2\}e^{j\Phi 2}$ is input to RF transmitter 812d for transmission on Ant. 4.

Figure 10:
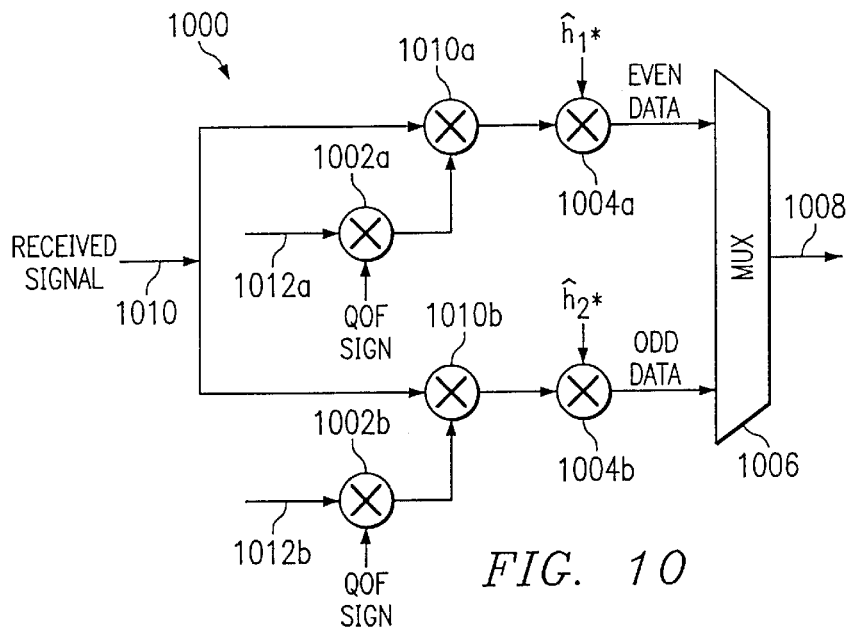
FIG. 10 shows a block diagram of portions of an embodiment of a receiver for use with the transmitter of FIG. 8.

Referring now to FIG. 10, therein is shown a block diagram of portions of an embodiment of a receiver 1000 for use with transmitter 800 of FIG. 8. Transmitter 800 comprises input 1010, Walsh function blocks 1002a and 1002b, Walsh multipliers 1010a and 1010b, multipliers 1004a and 1004b, multiplexers 1006 and output 1008. A received input signal is received at input 912 is demodulated using a OTD demodulator 1000 using the knowledge of channel coefficients h1* and h2*. The channel coefficients h1 and h2 for this OTD block are derived in the same as explained in FIG. 4 and FIG. 5. The OTD demodulator 1000 is implemented using 1010, 1010a,b and 1012a,b and 1004a,b and 1006. The OTD demodulated output 1008 is sent to rake combiner, deinterleaver, and channel decoder block 512 from FIG. 5.

Figure 11:
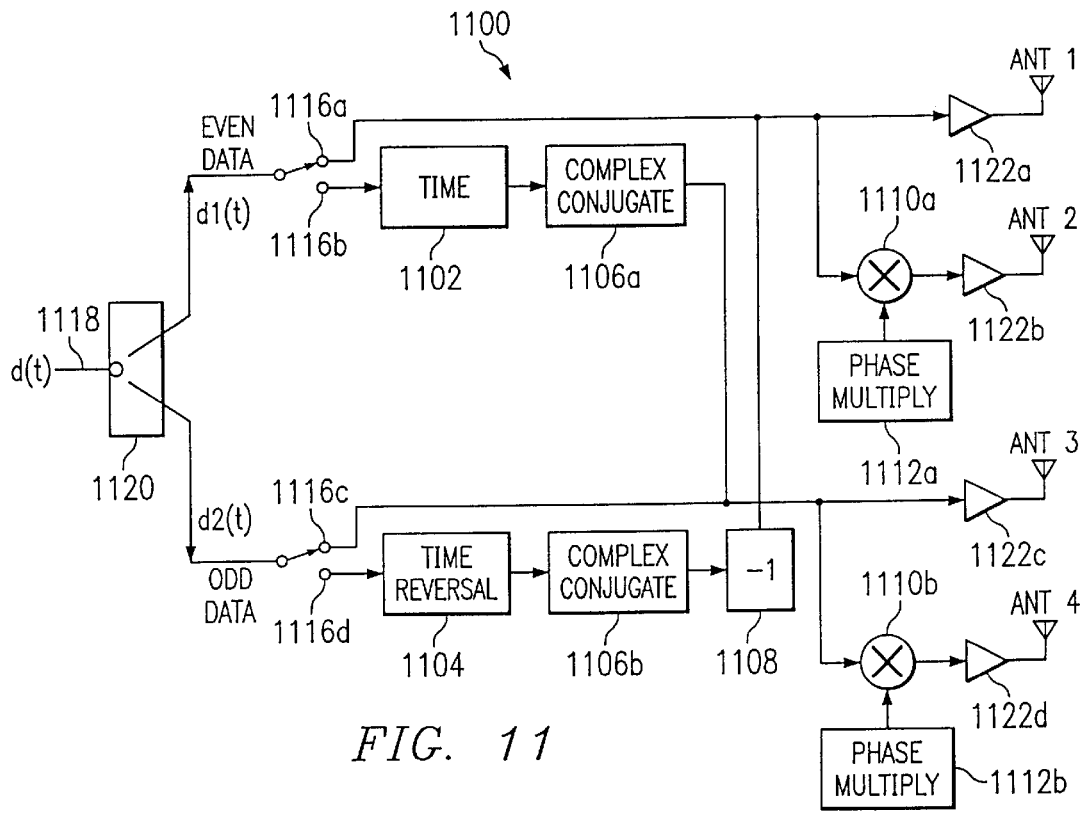
FIG. 11 shows a block diagram of portions of a long ST block code transmitter according to an embodiment of the invention.

The embodiment of FIG. 1 may also be implemented in a TDMA transmitter for operation in an EDGE system. Referring now to FIG. 11, therein is a block diagram of portions of a long ST block code transmitter according to an embodiment of the invention. Transmitter 1100 comprises input 1118, 1120, symbol stream processing branch inputs 1116a–1116d, time reversal blocks 1102 and 1104, complex conjugate blocks 1106a and 1106b, multiplier 1108, phase multiplier 1110a and 1110b, phase multiplier control blocks 1112a and 1112b, and antennas Ant. 1, Ant. 2, Ant. 3, and Ant. 4. Channel coder 1120 codes, punctures, interleaves, and formats a symbol stream received at input 1118. Channel coder 1120 also splits the input symbol stream into odd and even data streams. The even data stream is input to branch input 1116a and RF transmitter 1122a for transmission on Ant. 1 during the first half of a data burst and the odd data stream is input to branch input 1116c and RF transmitter 1112c for transmission on Ant. 2 during the first half of the data burst. During the second half of a burst, the even data stream is input to branch input 116b, time received on time reversal block 1102, complex conjugated in complex conjugate block 1106a and sent to RF transmitter 1122c for transmission on Ant. 3. The odd data stream is input to branch input 1116d, time reversed in time reversal block 1104, complex conjugated in complex conjugate block 1106b, multiplied by a negative in multiplier 1108 and sent to RF transmitter 1122d for transmission on Ant. 4 during the second half of the data burst. A training sequence SEQ1 is embedded in the middle of the burst transmit on Ant. 1 and a training sequence SEQ2 is embedded in the middle of burst transmit on Ant. 2. Phase multipliers 1112a and 1112b, phase shifts the inputs to RF transmitters 1122b and 1122d, using the multiplication blocks 1110a and 1110b respectively. The output of phase multiplier 1112a is then input to RF transmitter 1122b for transmission on Ant. 2 and the output of phase multiplier 1112b is input to RF transmitter 1122d for transmission on Ant. 4. The RF transmitters may perform of baseband pulse shaping, modulation, and carrier up conversion. In some implementations one may choose to apply the phase multiplication after baseband pulse shaping and modulation steps.

The phase rotation applied in phase multipliers 1122a and 1122b is kept constant during the burst length, with the phase being changed on a burst by burst basis. The phase can be chosen periodically or randomly from a MPSK constellation as explained previously. In a preferred embodiment the phase rotation on the Ant. 4 is kept same as phase rotation on ant2 with a 180 degree shift or multiplied by −1. The phase multiplication may be done before or after the base band pulse shaping. In an alternative embodiment of FIG. 11 the transmission on Ant. 1 and Ant. 3 may be intercharged.

The transmitter shown FIG. 3 can also be applied to EDGE with some modification. The space-time code described in 316 is applied blockwise instead of symbol wise for an EDGE application. The block length can be chosen as first half of the burst. In EDGE the length of the first half and second half of the bursts are equal to 58 symbols. In this case S1 and S2 denotes a block of symbols and ( )* denotes time reversal of a block of symbols and complex conjugation operation. S1* denotes the block of symbols S1 is time reversed and complex conjugated. −S2* denotes that the block of symbols S2 is time reversed, complex conjugated and multiplied by −1.0. The pilot sequences U1 and U2 can be chosen as two training sequences such as well-known CAZAC sequences. The spreading codes 308a,b,c,d will not be applied in EDGE. The phase multiplication blocks 306a and 306b are retained.

A receiver designed for a 2-antenna space time block code may be used as a receiver for the embodiments of FIG. 1 or FIG. 2.

From the preceding description and embodiments, one skilled in the art will realize that, although the method and apparatus of the present invention has illustrated and described with regard to particular embodiments thereof, it will be understood that numerous modifications and substitutions may be made to the embodiments described, and that numerous other embodiments of the invention may be implemented without departing from spirit and scope of the invention as defined in the following claims.

What is claimed is:

1. A method for transmitting a signal from a plurality of antennas, said method comprising the steps of:
   receiving a symbol stream at a transmitter;
   performing a transform on said input symbol stream to generate a transform result, said transform result comprising an NXN' orthogonal space-time block code, and generating N first signals;
   non-zero complex weighting, over time, at least one of the N first signals of said transform result to generate at least one second signal, each of said at least one second signals being phase shifted relative to the one of the N first signals from which it was generated, and wherein said non-zero complex weighting comprises phase shifting at least one of said N first signals by at least a first predetermined hopping sequence, wherein hopping weights for said predetermined hopping sequence are derived from a PSK constellation having 8 states, and wherein the predetermined hopping sequence in degrees is (0, 135, 270, 45, 180, 315, 90, 225); and,
   transmitting, substantially simultaneously, each of said N first signals of said transform result on one of a first at least one antenna and, each of said at least one second signals on one of a second at least one antenna said N first signals and said at least one second signal together comprising M signals wherein M is greater than N.

2. The method of claim 1 wherein the at least one second signal, phase shifted relative to the one of the N signals from which it was generated during said operation of non-zero complex weighting comprises a first second signal and at least a second second signal, wherein the at least the first predetermined hopping sequence comprises the first predetermined hopping sequence in the degrees (0, 135, 270, 45, 180, 315, 90, and 225) and at least a second predetermined hopping sequence, the second predetermined hopping sequence in degrees (180, 315, 90, 225, 0, 135, 270, 45).

3. An apparatus for transmitting a signal, said transmitter comprising:

an input symbol stream;

a processor for performing a transform on said input symbol stream to generate a transform result, said transform result comprising an N×N' orthogonal space-time block code, and generating N first signals;

at least one weighter for, non-zero complex weighting, over time, at least one of the N first signals of said transform result to generate at least one second signal, each of said at least one second weighted signals phase shifted relative to the one of the N first signals from which it was generated, and wherein said non-zero complex weighting comprises phase shifting at least one of said N first signals by at least a first predetermined hopping sequence, wherein hopping weights for said predetermined hopping sequence are derived from a PSK constellation having 8 states, and wherein the predetermined hopping sequence in degrees is (0,135, 270,45, 180,315,90,225); and, a transmitter for transmitting, substantially simultaneously, each of said N first signals of said transform result on one of a first at least one antenna, and each of said N second signals on one of a second at least one antenna said N first signals and said at least one second signal together comprising M signals wherein M is greater than N.

* * * * *